*INVENTOR*
SIDNEY L. PHILLIPS

*BY* Melvyn David Silver
ATTORNEY

United States Patent Office 3,704,211
Patented Nov. 28, 1972

3,704,211

PROCESS FOR ELECTROPLATING MAGNETIC FILMS FOR HIGH DENSITY RECORDING

Sidney L. Phillips, San Jose, Calif., assignor to International Business Machines Corporation, Armonk, N.Y.
Filed May 19, 1971, Ser. No. 144,961
Int. Cl. C23b 5/32
U.S. Cl. 204—43 17 Claims

ABSTRACT OF THE DISCLOSURE

A process for depositing a nickel-cobalt magnetic electroplate upon an electrically conducting substrate by passing a current between an anode and a substrate as the cathode through an electrolyte, where the electrolyte contains at least a soluble nickel salt and a soluble cobalt salt in solution, with the improvement for the purpose of effecting the $M_r/H_c$ ratio characterized by the addition of at least a small but effective amount of rhenium as a soluble rhenium salt to the electrolyte. The rhenium may be specifically added as potassium perrhenate to an electrolyte comprising nickel chloride and cobalt chloride salts in an aqueous solution.

FIELD OF THE INVENTION

This invention relates to a method for electroplating ferromagnetic films and an improved electroplating bath therefor, particularly, the electroplating of nickel-cobalt magnetic films for use in the recording arts.

PRIOR ART

Electroplating, because of its inherent simplicity, is used as a manufacturing technique in the fabrication of magnetic thin films. In applications to high density data storage drums, disks, and tapes, the recording medium control requirements include thickness, a nearly rectangular MH loop, a high coercive force usually exceeding 200 oersteds, and a low ratio of remanent magnetization to coercivity. The loop squareness is desired as the squarer the loop, the easier it is to change the direction of magnetization. A relatively high coercive force is also desired, however, so that accidental switching will not occur in the presence of a slight magnetic field, as opposed to the desired applied magnetic field. This permits permanent storage devices to be manufactured. Thickness control is utilized to allow rapid switching of the magnetic domains, and a high coercivity is desired for permanent recording to occur.

The first three requirements above are met by plating films less than 10 microinches thick from baths containing phosphite or hypophosphite salts. $M_r/H_c$ ratios usually fall in the range of 1.5 to 3 when plating from conventional baths. This is so for a variety of reasons, including the fact that the domain spacing is relatively large and compositional control is difficult to maintain as the bath is constantly being depleted during plating. There are of course other factors, such as impurity pickup, and the formation of a compositional gradient across the deposited film. Where unusual shapes are being plated, current control is difficult due to edge current factors. Also affecting the quality of plating in all baths is the anode-cathode spacing and pH control.

One of the parameters used to evaluate thin ferromagnetic films is the parameter $a$, which is related to the width of the boundary between magnetic domains. Small values of $a$ in the magnetic recording medium are necessary for obtaining high packing densities. Values of $a$ are related to film properties by an equation of the form:

$$a=k\delta M_r/H_c$$

where $\delta$=magnetic film thickness
$M_r$=remanent magnetization
$H_c$=coercivity
$k$=constant From this equation it is seen that decreasing the recording medium thickness or decreasing the ratio $M_r/H_c$ results in small values of $a$, and favors higher density recording. It is evident that one means of possibly approaching a small $M_r/H_c$ ratio is to be able to plate a film having small, tightly packed grains where each grain is essentially a single crystal magnetic domain, and the spacing between grains is small. If this spacing and grain size is smaller than the bit size recorded, then the desired ratio may be met. It is evident then that grain refiners might be desired to achieve the small grain size. However, grain refiners well known in the electroplating arts do not result in the desired lowering of the $M_r/H_c$ ratio as is necessary for high density recording electroplated magnetic films.

Thus, an object of this invention is to provide a plating process resulting in a low $M_r/H_c$ ratio. Further, an additional object is the provision of a broad range of compositional limits on the electrolyte utilized in the above plating process to permit wide control of the $M_r/H_c$ ratio.

Yet another object of this invention is to utilize a particular grain refiner in a manner permitting uniform compositional control of the grain refiner during the plating process.

Still another object of this invention is to utilize well known electroplating baths commercially available with but the addition of a particular additive to permit the desired control of $M_r/H_c$ ratio for high density recordings.

SUMMARY OF THE INVENTION

These and other objects are met by the process of this invention in which to a conventional nickel-cobalt electroplating bath, wherein nickel salts and cobalt salts are dissolved in an electrolyte and a current passes between an anode and a substrate acting as a cathode, rhenium as a rhenium salt is added to the electrolyte in at least a small but effective amount resulting in controllable $M_r/H_c$ ratio. Typically, the nickel salt is nickel chloride hexahydrate, the cobalt salt is cobalt chloride hexahydrate, and the rhenium is added as potassium perrhenate.

The above and other embodiments in compositional limitations upon this invention will be evident when read in conjunction with the following drawings and general description.

GENERAL DESCRIPTION

A typical cobalt nickel electroplating bath generally contains simple salts of cobalt and nickel, with various additions of phosphorus salts, sodium salts, and ammonium salts.

Magnetic baths commonly include nickel-cobalt, iron-nickel, iron-nickel-cobalt, cobalt-tungsten, cobalt-molybdenum, and cobalt-phosphorus as examples. Typical additives for such baths, which as noted above include the nickel-cobalt baths of interest here, are phosphorus added as a phosphite, or hypophosphite for coercivity control and is usually added in the range of .1 to 5 grams/liter of that solution. Carbon is often added as sodium benzoate for coercivity control, and is usually added in the range of up to one gram/liter of that solution. Tungsten is occasionally added as tungstate, molybdenum as molybdate, arsenic as arsenate, chromium as chromate, all for coercivity control, usually added in the range of up to one gram/liter of solution depending upon the particular bath composition utilized. Occasionally also a wetting agent is added for adhesion improvements. Such wetting agents would include sodium lauryl sulphate as an example.

Of course, an electrolyte is used as the electrical conductor. These include ammonium chloride, sodium sulphate decahydrate, sodium citrate, sodium potassium tartrate, and others. Some of these are aqueous solutions, and others are not. Some of the above materials are added as metal complexing or chelating agents.

As to the nickel and cobalt salts themselves and the particular case in interest, they may be added as cobalt chloride hexhydrate, or nickel chloride hexahydrate, or any of the conventionally known nickel salts, for aqueous or non-aqueous solutions. Thus, nickel and cobalt salts in the form of sulphates, nitrates and chlorides are utilizable as are other common salts. A typical bath composition for the magnetic recording arts might be designed to form a final film composition of approximately, by weight, 80% cobalt and 20% nickel.

While acceptable nickel-cobalt ferromagnetic electroplates may be made utilizing the baths above, low ratio $M_r/H_c$ films are difficult to maintain. The substrate material utilized does not appear to be particularly significant, and copper or copper alloys, or essentially any conductive material including electroless plated materials upon non-conductive surfaces or otherwise metalized surfaces may be utilized. Of course, the shape of the part or substrate may include wire, tape, disks, plates, drums, cones, squares, rectangles or spheres, or any other shape desirable.

Figure 1:
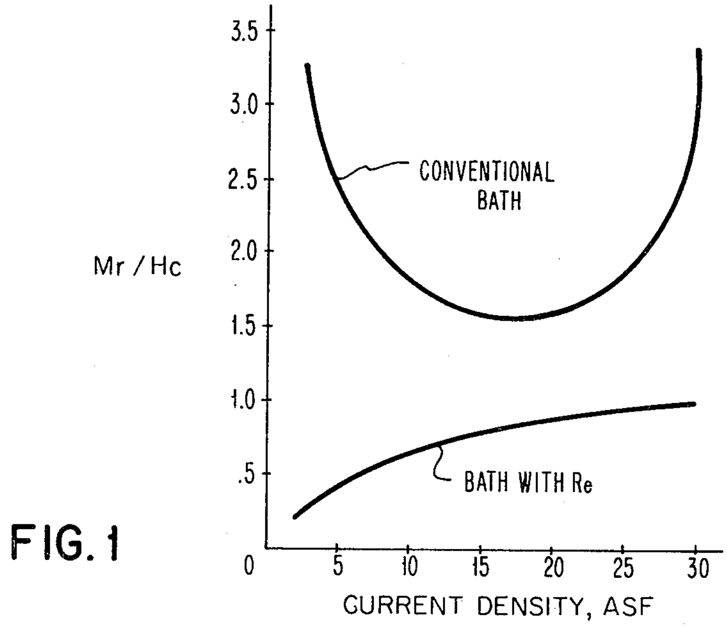
FIG. 1 is a graph showing the $M_r/H_c$ ratio versus current density in amps/square foot for a conventional rhenium free nickel-cobalt electroplating bath when compared to bath having rhenium additions.

It has been discovered that the addition of rhenium to a nickel-cobalt or a cobalt electroplating bath in a small but effective amount appears to serve as a grain refiner, usually up to approximately 1% of the final composition by weight, and has the unexpected result of modifying and allowing control of the $M_r/H_c$ ratio of the deposited film. For example, FIG. 1 shows the controllable effect upon a particular electroplating bath. The conventional bath comprises substantially 110 grams/liter of nickel chloride hexahydrate, 50 grams/liter of cobalt chloride hexahydrate, 50 grams of sodium phosphite trihydrate, and 25 grams/liter ammonium chloride, at a pH of 4.5 and a temperature of 21–24° C. The current density is varied as shown.

As can be seen from the two curves, the conventional bath above has an essentially random $M_r/H_c$ ratio. However, the bath below has a continuously controllable $M_r/H_c$ ratio with but the addition of 0.32 gram/liter of rhenium in the form of potassium perrhenate, added as .5 gm./liter in the salt form potassium perrhenate.

FIG. 1 above shows the effect of rhenium ions added to a well known bath containing the well known phosphite additive, thus showing the effect of the rhenium addition where a coercivity control ion, phosphorous, is already present in the bath. By contrast, FIG. 2, discussed below, shows the effect of rhenium ions as a stand-alone additive—the same bath as FIG. 1, but without the added phosphorous.

Figure 2:
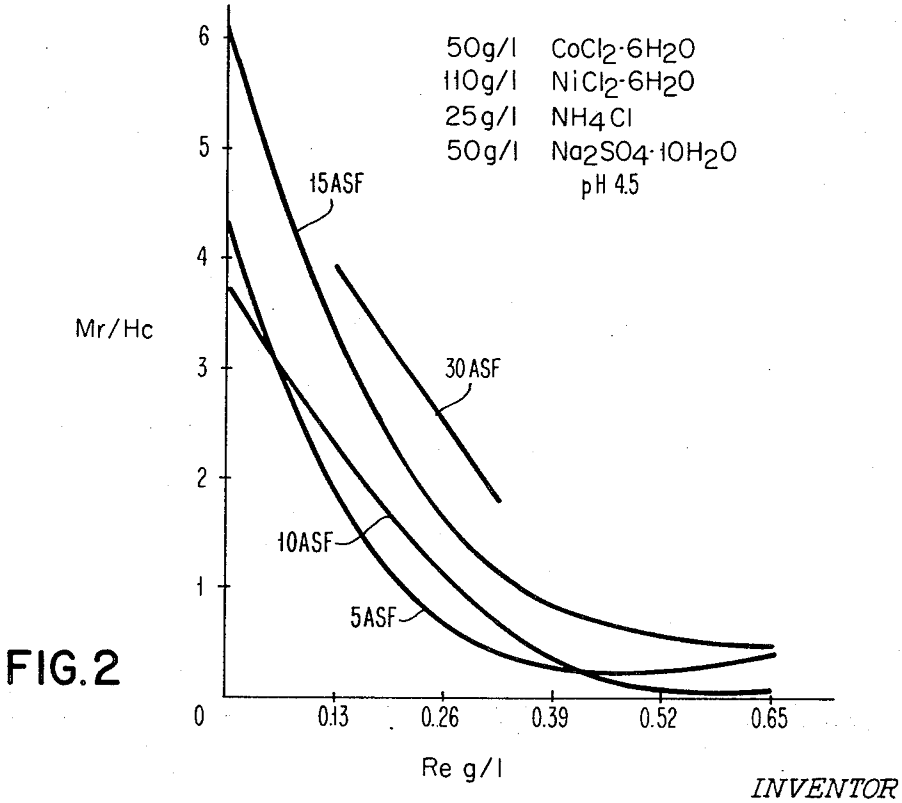
FIG. 2 is a graph showing the effects of rhenium ions in grams/liter in solution versus $M_r/H_c$ for a phosphorous free rhenium additive plating bath, at different current density levels.

In FIG. 2, to further illustrate the dramatic effect of the rhenium salt addition, a similar plating bath is utilized but with the rhenium ion concentration being varied as shown, and no phosphorous ions present. It is noted that above approximately 0.64 gram/liter of rhenium, or one gram/liter of potassium perrhenate, noticeable increases in the effects of the addition decrease markedly. Above 1.28 gms./liter rhenium ions, or two grams/liter $KReO_4$ in the above bath, not shown on the above chart, the effect is very much less marked, and is essentially negligible for the case of potassium perrhenate in this particular bath.

It is not known in what state of ionization the rhenium exists in the various baths. When the perrhenate is used with $NiCl_2$ and $CoCl_2$, it is believed that the rhenium exists in the +7 state. However, it may in fact be reduced to another lower valence state. What does appear to be important is the concentration of rhenium as or in an ion form in grams/liter, rather than the particular ion state in which it exists in a given solution.

Rhenium ions have been added to ferromagnetic material baths for the purpose of effecting the properties of the material, as shown in Chemical Abstracts 57; 3186–87 (1962). However, while it is recognized that rhenium additions may be added to ferromagnetic films for the purpose of hardness control, wear resistance, and other factors, it was not known before that rhenium can be added in the small quantities as utilized here for the purpose of effecting the $M_r/H_c$ ratio. Thus, while there may be side effects as improved hardness, wear, or other factors, the principal effect is the magnetic control.

Broadly speaking, the effective range for which the addition of rhenium ions is effective is shown in the table below:

TABLE I

[Grams/liter]

| Type of ion in solution | General range | Preferred range | Preferred embodiment |
|---|---|---|---|
| Ni | 0–26 | 22–26 | 26 |
| CO | 10–13 | 10–12 | 12 |
| Re | .06–1.3 | .13–.16 | .32 |
| P | 0–0.7 | .01–.14 | 0 |
| Na | 4.5–5.5 | 4.5–5.5 | 5 |
| $NH_4$ | 7–10 | 7–8 | 8 |
| pH | 3–5 | 4–4.5 | 4.5 |
| Temperature (° C.) | 20–55 | 21–24 | 21–24 |
| Current density, amp/sq. ft | .1–30 | 10–20 | 10 |

TABLE II

[As salts in solution, Grams/liter]

| | General range | Preferred range | Preferred embodiment |
|---|---|---|---|
| $NiCl_2 \cdot 6H_2O$ | 0–110 | 90–110 | 110 |
| $CoCl_2 \cdot 6H_2O$ | 45–55 | 45–50 | 50 |
| $Na_2HPO_3 \cdot 5H_2O$ | 0–5 | .1–1 | 0 |
| $Na_2SO_4 \cdot 10H_2O$ | 45–55 | 45–55 | 50 |
| $NH_4Cl$ | 20–30 | 22–25 | 25 |
| $KReO_4$ | .1–2 | .2–1 | .5 |
| pH | 3–5 | 4–4.5 | 4.5 |
| Temperature (° C.) | 20–55 | 21–24 | 21–24 |
| Current density, amp/sq. ft | .1–30 | 10–20 | 10 |

Plating rates above will vary with concentration and current, of course, but for example, the preferred embodiment will plate 10$\mu''$ thickness at 10 ASF in 75 sec. of a bright plating.

In Table I above, the key constituents of the bath are the nickel, cobalt and rhenium. Phosphorus is included as it is a well known and effective coercivity control additive. Na and $NH_4$ are included to further show a complete and well known bath system. The anions are not included as being obvious from the cations in solution. Other cations may be utilized in place of Na or $NH_4$, and other grain refiners for the P.

One embodiment of the invention is a bath having 1–110 g./l. of $NiCl_2 \cdot 6H_2O$, 45–55 g./l. $CoCl_2 \cdot 6H_2O$ and 0.1–2 g./l. of $KReO_4$. The metal ionic content of such a bath is approximately 0.25–26 g./l. nickel ions, 10–13 g./l. cobalt ions and 0.06–1.29 g./l. rhenium ions.

While potassium perrhenate is one of the more commercially available materials, sodium perrhenate is also widely used and may be substituted. It is also possible to fabricate and use cesium perrhenate by mixing sodium perrhenate and cesium chloride in water and precipitating cesium perrhenate from solution. Further, rhenium chloride, $ReCl_3$, or rhenium septoxide are utilizable. While the +7 form of rhenium is most widely used, and comes from an alkali family perrhenate, rhenium in its various other salt additions may also be utilized to match the particular nickel-cobalt salts utilized as the particular electrolyte. For example, the solubility of potassium perrhenate in water at 20° C. is 12 grams/liter, while sodium perrhenate is 250 grams/liter. Depending thus upon the results desired, it is possible to supersaturate the electrolyte with potassium perrhenate when utilizing the nickel chloride and cobalt chloride salts, so that excess potassium perrhenate rests at the bottom of the solution. Consequently, as rhenium is utilized and depleted during the plating process, additional rhenium will dissolve from the salts at the bottom of the plating bath, thus maintaining a uniform quantity of rhenium ions in the solution, and consequently, in the deposited film.

The solubility of each rhenium salt varies in each particular electrolyte. Also, each electrolyte, as a function of the particular ratio of salts in solution, will dissolve different amounts of the rhenium salt. Thus the "start point" where the rhenium effect becomes noticeable will vary with each solution. However, those skilled in the art may readily determine which small but effective amount of which salt in which electrolyte gives the start of the desired effect, and where the effect is no longer noted. Magnetic tests are performed in the well known manner.

Thus, in summary, it has been found that the addition of rhenium to a nickel-cobalt plating bath, in at least a small but effective amount is effective to affect the $M_r/H_c$ ratios thus making such films more desirable for high density recording purposes. The rhenium is most preferably added to the electroplating bath in the form of potassium perrhenate as it is most commercially available today, but may be added in the multiplicity of other forms of salts in which rhenium is available. Various additives may also be utilized in the well known nickel cobalt plating bath compositions, such as various sodium salts, phosphorous, and ammonium additives, for well known purposes.

What is claimed is:

1. In the process of depositing a nickel-cobalt magnetic electroplate upon an electrically conducting substrate by passing a current between an anode and the substrate as a cathode through an electrolyte comprising at least a soluble nickel salt and a soluble cobalt salt in an aqueous acidic solution, the improvement for the purpose of affecting the $M_r/H_c$ ratio characterized wherein the electrolyte contains as ions in solution nickel substantially between .25–26 grams/liter; cobalt between substantially 10–13 grams/liter; and rhenium ions between substantially .06/1.29 grams/liter.

2. The process of claim 1 wherein said rhenium ions are added as a rhenium containing salt forming the 7+ rhenium ion in said electrolyte.

3. The process of claim 1 wherein said rhenium ions are added as an alkali metal perrhenate.

4. The process of claim 1 wherein said rhenium ions are added from the group consisting of $NaReO_4$, $RbReO_4$, $CsReO_4$ and $KReO_4$.

5. The process of claim 1 wherein said rhenium ions are added as a rhenium salt of limited solubility in said electrolyte in an amount beyond saturation of said electrolyte so as to maintain a uniform concentration of rhenium ions in the electrolyte during the electroplating process.

6. The process of claim 1 wherein said nickel salt is $NiCl_2 \cdot 6H_2O$ and said cobalt salt is $CoCl_2 \cdot 6H_2O$.

7. The process of claim 1 wherein said rhenium ions are added as $KReO_4$.

8. The process of claim 1 wherein said electrolyte further contains as ions phosphorous substantially between 0 and 0.7 gm./liter.

9. The process of claim 1 including the steps of maintaining the electrolyte pH substantially between 3–5; the temperature substantially between 20–55° C.; and the current density at the substrate substantially between .1–30 amps/square foot.

10. In the process of depositing a nickel-cobalt magnetic electroplate upon an electrically conducting substrate by passing a current between an anode and the substrate as a cathode through an electrolyte comprising at least a soluble nickel salt and a soluble cobalt salt in an aqueous acidic solution, the improvement for the purpose of affecting the $M_r/H_c$ ratio characterized wherein.

said nickel salt is $NiCl_2 \cdot 6H_2O$ present in an amount substantially between 1–110 gm./liter of solution and said cobalt salt is $CoCl_2 \cdot 6H_2O$ present in an amount substantially between 45–55 gms./liter of solution, and includign $KReO_4$ present in an amount substantially between .1–2 gms./liter of solution.

11. The process of claim 10 wherein included in such electrolyte is $Na_2HPO_3 \cdot 5H_2O$ substantially between 0–5 gms./liter of solution, $Na_2SO_4 \cdot 10H_2O$ substantially between 45–55 gms./liter of solution and $NH_4Cl$ substantially between 20–30 gms./liter of solution; said electrolyte pH is substantially between 3–5; and said electrolyte temperature is maintained substantially between 20–55° C.

12. The process of claim 11 wherein said electrolyte materials are present in the concentration ranges of $NiCl_2 \cdot 6H_2O$, substantially 90–110 gms./liter of solution; $CoCl_2 \cdot 6H_2O$, substantially 45–55 grams/liter of solution, $KReO_4$ substantially, .2–1 gms./liter of solution; $Na_2HPO_3 \cdot 5H_2O$, substantially 0–1 gms./liter of solution; $NH_4Cl$, substantially 22–25 gms./liter of solution; the pH is maintained substantially between 4–4.5; and the temperature is maintained substantially between 21–24° C.

13. The process of claim 12 wherein said electrolyte materials are present in the concentrations of $$NlCl_2 \cdot 6H_2O_1$$

substantially 110 gms./liter of solution; $CoCl \cdot 6H_2O$, substantially 50 gms./liter of solution; $KReO_4$, substantially .5 gm./liter of solution; $Na_2SO_4 \cdot 10H_2O$, substantially 50 gms./liter of solution; $NH_4Cl$, substantially 25 gms./liter of solution; pH is substantially 4.5; and the temperature is maintained substantially between 21–24° C.

14. The method of claim 12 including the step of maintaining the current density upon said substrate substantially between 10–20 amps per square foot.

15. The method of claim 10 including the step of maintaining the current density upon said substrate substantially between .1–30 amps per square foot.

16. In the process of depositing a nickel-cobalt magnetic electroplate upon an electrically conducting substrate by passing a current between an anode and the substrate as a cathode through an electrolyte comprising at least a soluble nickel salt and a soluble cobalt salt in an aqueous acidic solution, the improvement for the purpose of affecting the $M_r/H_c$ ratio characterized wherein the electrolyte contains as ions in solution/nickel substantially between 22–26 grams/liter; cobalt between substantially 10–12 grams/liter; rhenium ions between substantially .13–.6 gram/liter; P substantially between .01 and .14 grm./liter- Na substantially between 4.5 and 5.5 gms./liter; and $NH_4$ substantially between 7 and 8 gms./liter.

17. The process of claim 16 including the steps of maintaining said electrolyte pH substantially between 4–4.5; temperature substantially between 21–24° C.; and current density at said substrate substantially to 10–20 amps/square foot.

References Cited

FOREIGN PATENTS 130,308 9/1959 U.S.S.R. ------------ 204—43

OTHER REFERENCES

Chemical Abstracts, vol. 72, 38142X (1970).

Chemical Abstracts, vol. 57, 3186h (1962).

Metal Finishing, p. 43, November 1969.

Larissa Domnikov, Metal Finishing, vol. 62, No. 1, pp. 49–51 (1964).

GERALD L. KAPLAN, Primary Examiner

U.S. Cl. X.R.

340—174 TF